United States Patent
Maeda

(10) Patent No.: US 11,583,917 B2
(45) Date of Patent: Feb. 21, 2023

(54) FORMING METHOD AND FORMING DEVICE FOR ARC SPRING

(71) Applicant: NHK SPRING CO., LTD., Yokohama (JP)

(72) Inventor: Masaaki Maeda, Yokohama (JP)

(73) Assignee: NHK Spring Co., Ltd., Kanagawa (JP)

( * ) Notice: Subject to any disclaimer, the term of this patent is extended or adjusted under 35 U.S.C. 154(b) by 12 days.

(21) Appl. No.: 17/273,923

(22) PCT Filed: Sep. 3, 2019

(86) PCT No.: PCT/JP2019/034564
§ 371 (c)(1),
(2) Date: Mar. 5, 2021

(87) PCT Pub. No.: WO2020/050248
PCT Pub. Date: Mar. 12, 2020

(65) Prior Publication Data
US 2021/0308740 A1    Oct. 7, 2021

(30) Foreign Application Priority Data

Sep. 6, 2018 (JP) .............................. JP2018-167138

(51) Int. Cl.
*B21F 35/00* (2006.01)
(52) U.S. Cl.
CPC .................................... *B21F 35/00* (2013.01)
(58) Field of Classification Search
CPC .... B22F 12/00; B22F 10/10; B22F 2005/001; B22F 2999/00; B22F 10/20; B22F 5/106;
(Continued)

(56) References Cited

U.S. PATENT DOCUMENTS 5,464,198 A    11/1995  Yanko et al.
8,136,379 B2 *  3/2012  Itaya ......................... B21F 3/02
                                                            451/21
(Continued)

FOREIGN PATENT DOCUMENTS

JP    5-196075 A    8/1993
JP    2003-136171 A    5/2003
(Continued)

*Primary Examiner* — Lawrence Averick
(74) *Attorney, Agent, or Firm* — Norris McLaughlin, P.A.

(57) ABSTRACT

Provided are a forming method for an arc spring, capable of easily and surely locating bearing faces on both end faces of a semi-finished product in predetermined positions, the bearing faces having lengths within permissible ranges in a circumferential direction. For a semi-finished product prior to curving an axis, it is determined whether circumferential lengths of bearing faces on both end faces are respectively within the permissible ranges based on end face image information of the both end faces imaged in an axial direction prior to the curving, a circumferential rotational position of the semi-finished product capable of respectively locating the bearing faces within the predetermined positions is specified using the end face image information, and the semi-finished product is rotated to the specified rotational position, and the wedge part is sequentially driven into inter-wires of the semi-finished product to deform the semi-finished product.

9 Claims, 5 Drawing Sheets

(58) Field of Classification Search
CPC ......... B22F 10/00; B33Y 10/00; B33Y 30/00; B33Y 80/00; B23K 26/34; B29C 64/153; E21B 17/042; E21B 17/02; Y02P 10/25
See application file for complete search history.

(56) References Cited

U.S. PATENT DOCUMENTS

| | | | |
|---|---|---|---|
| 8,266,940 B2* | 9/2012 | Riemeier | B21D 7/02 72/306 |
| 8,912,472 B1* | 12/2014 | Kurylo | H05B 6/36 267/74 |
| 9,321,089 B2* | 4/2016 | Krueger | B21C 51/00 |
| 9,610,628 B2* | 4/2017 | Riemeier | B21F 23/005 |
| 10,076,780 B2* | 9/2018 | Riemeier | G01B 11/24 |
| 10,130,987 B2* | 11/2018 | Riemeier | B21F 45/008 |
| 10,472,695 B1* | 11/2019 | Kurylo | H05B 6/36 |
| 11,072,021 B2* | 7/2021 | Riemeier | G01B 11/24 |
| 2008/0302156 A1* | 12/2008 | Itaya | B21F 3/02 72/138 |
| 2010/0275668 A1* | 11/2010 | Riemeier | B21F 3/00 72/293 |
| 2011/0214467 A1* | 9/2011 | Krueger | B21F 3/02 72/19.7 |
| 2011/0239718 A1 | 10/2011 | Kalkau | |
| 2014/0076015 A1* | 3/2014 | Riemeier | B21F 23/005 72/37 |
| 2014/0367374 A1* | 12/2014 | Kurylo | H05B 6/101 219/635 |
| 2016/0114377 A1* | 4/2016 | Riemeier | B25J 9/1697 72/369 |
| 2016/0114378 A1* | 4/2016 | Riemeier | B21F 45/008 72/369 |
| 2019/0001396 A1* | 1/2019 | Riemeier | B21F 23/005 |
| 2019/0337046 A1* | 11/2019 | Sugita | B21F 3/06 |
| 2021/0308741 A1* | 10/2021 | Riemeier | B25J 9/1682 |

FOREIGN PATENT DOCUMENTS

| | | |
|---|---|---|
| JP | 5666954 B2 | 2/2015 |
| JP | 6113891 B2 | 4/2017 |
| JP | 6300996 B1 | 3/2018 |

* cited by examiner

FORMING METHOD AND FORMING DEVICE FOR ARC SPRING

FIELD OF THE INVENTION

The present invention relates to a forming method and a forming device for an arc spring used in a clutch of an automatic transmission of an automobile or the like.

BACKGROUND OF THE INVENTION

An arc spring is a coil spring having an arc shape the axis of which is curved, and may be plastically deformed a semi-finished linear product spirally coiled. As a forming method for such an arc spring, there is one disclosed in, for example, Patent document 1.

The forming method of Patent document 1 drives a wedge into inter-wires of a coiled shape while moving a semi-finished linear product in a direction along an axis thereof, thereby to plastically deform the semi-finished product. At the time of the forming of the arc spring, it may be required that bearing faces on end faces are located in predetermined positions in a circumferential direction, lengths of the bearing faces are within permissible ranges, and the like according to specifications.

For the requirements, the forming method of Patent document 1 detects an arrangement state of the bearing face on the end face on one side of the semi-finished product relative to the predetermined position using an image sensor, and performs correction of a rotational position of the semi-finished product so as to make the bearing face be located within the predetermined position in the circumferential direction according to the detected arrangement state.

The semi-finished product, however, varies in the number of turns and the like in manufacturing and accordingly varies in a positional relation between the bearing faces on both end faces. According to the variation in the positional relation between the bearing faces, even if the bearing face on the end face on one side is located at the predetermined position, the bearing face on the end face on the opposite side may be out of the predetermined position.

Further, the forming method of Patent document 1 simply detects the arrangement state of the bearing faces of the semi-finished product relative to the predetermined positions, and therefore the lengths of the bearing faces in the circumferential direction may be out of the permissible range according to the requirement even if the bearing faces on both end faces are located within the predetermined positions. Although such a risk may be eliminated by performing a special checking step, it causes a problem that it takes time to form the arc spring.

PATENT DOCUMENT 1: JP 6300996 B

SUMMARY OF THE INVENTION

A problem to be solved is that, even if the bearing face on the end face on one side of the semi-finished product is located at the predetermined position, the bearing face on the end face on the other side may be out of the predetermined position and the lengths in the circumferential direction of the bearing faces may be out of the permissible ranges according to the requirements.

The present invention, in order to easily and certainly arrange bearing faces on both end faces of a coiled part in predetermined positions, the bearing faces having lengths within permissible ranges in a circumferential direction according to requirements, primarily characterizes a forming method for an arc spring in which a wire is wound in a coiled shape with an axis curved and both end faces have respective bearing faces by comprising a bearing face length determining step of determining, for a semi-finished product prior to curving the axis, whether lengths of the bearing faces on the both end faces in a circumferential direction are respectively within permissible ranges based on end face image information of the both end faces of the semi-finished product imaged in a direction along the axis of the semi-finished product prior to the curving, a rotational position determining step of, if the lengths of the bearing faces of the both end faces in the circumferential direction are respectively within the permissible ranges, determining whether there is a rotational position of the semi-finished product in the circumferential direction, the rotational position at which the bearing faces on the both end faces are respectively located within predetermined positions in the circumferential direction using the end face image information, a specifying step of specifying a rotational position of the semi-finished product at which the bearing faces on the both end faces are respectively located within the predetermined positions in the circumferential direction based on a determining result in the rotational position determining step, a rotation step of rotating the semi-finished product to the specified rotational position, and a formation step of sequentially driving a wedge part into inter-wires of the coiled shape of the semi-finished product while moving the semi-finished product in the direction along the axis prior to the curving, thereby to deform the semi-finished product.

The present invention primarily characterizes a forming device for an arc spring, the arch spring in which a wire is wound in a coiled shape with an axis curved and both end faces have respective bearing faces, by comprising an imaging part configured to image the both end faces of a semi-finished product prior to curving the axis in a direction along the axis of the semi-finished product prior to the curving to obtain end face image information, a rotational mechanism part configured to rotate the semi-finished product, a holding part configured to hold the semi-finished product and move the semi-finished product in the direction along the axis of the semi-finished product, a wedge part configured to be driven into inter-wires of the coiled shape of the semi-finished product to deform the semi-finished product at the time of the moving of the semi-finished product, and a control part controlling the holding part, the rotational mechanism part, and the wedge part, wherein the control part determines whether lengths of the bearing faces on the both end faces in a circumferential direction are respectively within permissible ranges based on the end face image information obtained from the imaging part, if the lengths of the bearing faces of the both end faces are respectively within the permissible ranges, determines whether there is a rotational position of the semi-finished product in the circumferential direction, the rotational position at which the bearing faces on the both end faces are respectively located within predetermined positions of the semi-finished product in the circumferential direction using the end face image information, specifies a rotational position of the semi-finished product at which the bearing faces on the both end faces are respectively located within the predetermined positions in the circumferential direction based on a determining result of the rotational position, rotates the semi-finished product to the specified rotational position by means of the rotational mechanism part, and sequentially drives the wedge part into the inter-wires of the coiled shape of the semi-finished product while moving the semi-finished product in the direction along the axis by means of the holding part.

The forming method and device for an arc spring according to the present invention sort out a semi-finished product having bearing faces on both end faces with lengths in the circumferential direction within the permissible ranges based on end face image information of the both end faces of the semi-finished product, and rotate the semi-finished product to a specified rotational position to arrange the both bearing faces in the predetermined positions while grasping correlation of the both bearing faces of the sorted-out semi-finished product based on the end face image information of the both bearing faces which is used for the sorting-out of the semi-finished product. Accordingly, the bearing faces on the both end faces of the semi-finished product having the circumferential lengths within the permissible ranges are easily and certainly arranged in the predetermined positions.

BRIEF DESCRIPTION OF THE DRAWINGS

FIGS. 3A and 3B illustrate schematic configurations of an imaging stage of the forming device of FIG. 1 in which FIG. 3A is a plan view and FIG. 3B is a side view;

FIGS. 4A and 4B illustrate schematic configurations of an arc forming stage of the forming device of FIG. 1 in which FIG. 4A is a plan view and FIG. 4B is a partially omitted side view;

EMBODIMENT FOR CARRYING OUT THE INVENTION

The present invention accomplishes the object that bearing faces on both end faces of a semi-finished product are easily and certainly arranged in predetermined positions, the bearing faces having lengths within permissible ranges in a circumferential direction, by determining whether lengths of the bearing faces of the both end faces in a circumferential direction are within permissible ranges based on end face image information of the both end faces of the semi-finished product and thereafter rotating the semi-finished product to a rotational position at which the bearing faces of the both end faces are arranged within respective predetermined positions in the circumferential direction.

Figure 1:
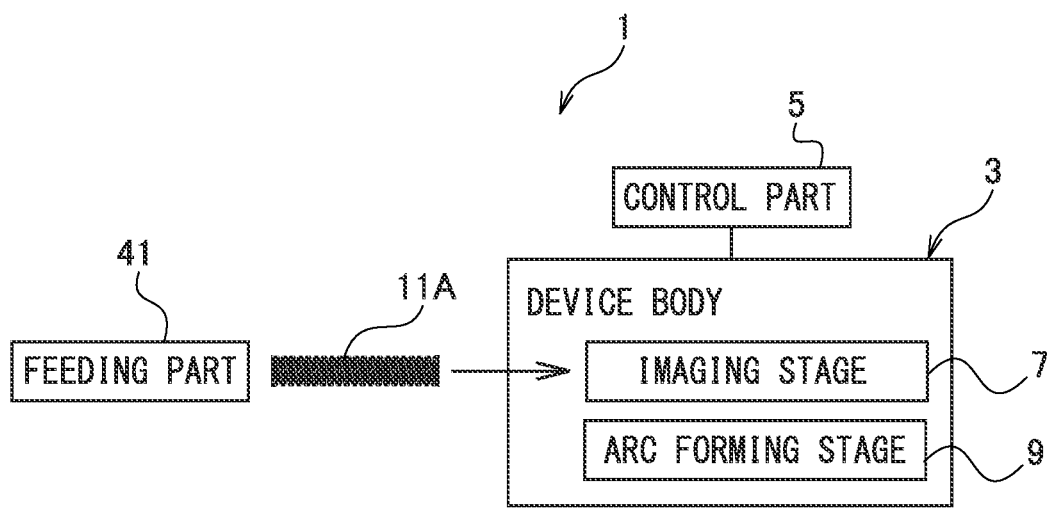
FIG. 1 is a schematic block diagram of a forming device for an arc spring according to an embodiment of the present invention.
Figure 2A:
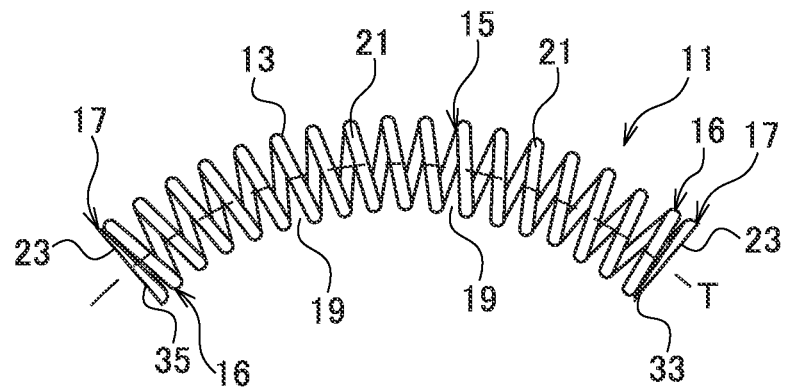
FIG. 2A is a side view illustrating an arc spring.
Figure 2B:
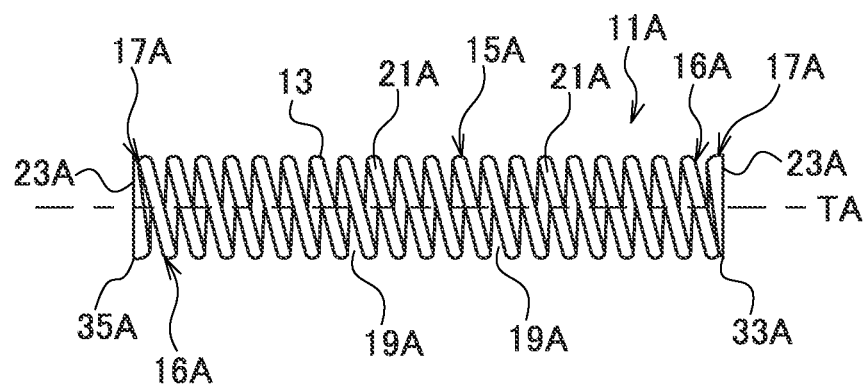
FIG. 2B is a side view illustrating a semi-finished product of the arc spring.
Figure 2C:
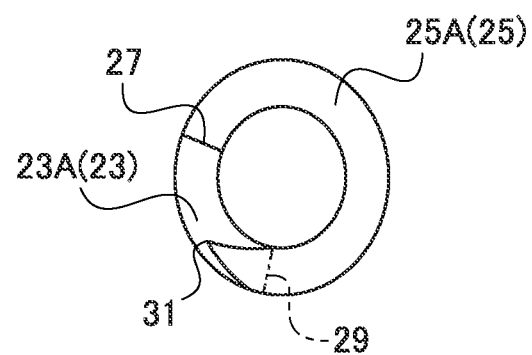
FIG. 2C is a plan view of the semi-finished product according to the embodiment of the present invention.

FIG. 1 is a schematic block diagram of a forming device for an arc spring, and FIGS. 2A-2C are a side view illustrating an arc spring, a side view illustrating a semi-finished product of the arc spring, and a plan view of the semi-finished product of the same, respectively.

The forming device 1 for an arc spring (hereinafter simply referred to as "forming device 1") is provided with a device body 3 and a control part 5, as illustrated in FIG. 1.

The device body 3 is provided with an imaging stage 7 and an arc forming stage 9, plastically deforms a semi-finished product 11A of FIG. 2B prior to curving an axis TA according to control of the control part 5, to form an arc spring 11 of FIG. 2A with an axis T curved.

The arc spring 11 and the semi-finished product 11A of the present embodiment are coil springs in which wires 13 are would in a coiled shape. The arc spring 11 has an arc shape according to curvature of the axis T and the semi-finished product 11A has a straight shape.

It should be noted that the semi-finished product 11A means one prior to curving the axis TA and is not necessarily straight. Accordingly, the semi-finished product 11A also includes one having an axis TA which is curved or bent relatively to a straight shape in a manufacturing process and the like.

The arc spring 11 and the semi-finished product 11A have main bodies 15, 15A, end turn portions 17, 17A of both end portions, and transition portions 16, 16A.

The main bodies 15, 15A are formed relatively large in distances (hereinafter referred to as "inter-wire pitch") of inter-wires 19, 19A (gaps between adjacent coils 21, 21A) of the coiled shapes in directions along axes T, TA. It should be noted that the direction along the curved axis T is hereinafter referred to as an "axial direction" and the direction along the axis TA prior to the curving is hereinafter referred to as an "axial direction prior to the curving" or an "un-curved axial direction".

The end turn portions 17, 17A form end portions of the arc spring 11 and the semi-finished product 11A and have inter-wire pitches being zero in the case of the closed end arc spring 11 and the closed end semi-finished product 11A like the present embodiment. The arc spring 11 and the semi-finished product 11A may be, however, open-end, and inter-wire pitches of the end turn portions 17, 17A are formed greater than zero in this case.

The transition portions 16, 16A are formed between the main bodies 15, 15A and the end turn portions 17, 17A and are portions to cause transitions from the end turn portions 17, 17A to the main bodies 15, 15A. Inter-wire pitches of the transition portions 16, 16A are formed smaller the inter-wire pitches of the main bodies 15, 15A.

On both end faces 23, 23A in the axial direction and the un-curved axial direction of the arc spring 11 and the semi-finished product 11A, bearing faces 25, 25A are formed. It should be noted that the bearing faces 25, 25A of the arc spring 11 and the semi-finished product 11A have the same configuration and only the bearing face 25A of the semi-finished product 11A will be explained. In FIG. 2C, the bearing face 25A is indicated with a cross-hatching for easily understanding.

The bearing face 25A is a cutting face formed by partly cutting the end face 23A, and extends over a range, a central angle of which is about 290 degrees with a coil end portion 27 of the main body 15A as a beginning point. It should be noted that the central angle of the bearing face 25A may be varied according to a specification of the arc spring 11.

A shape of the beginning point of the bearing face 25A is a linear shape intersecting a circumferential direction. A shape of an end point of the bearing face 25A projects in an acute angle shape in the circumferential direction and is gradually narrowed in a radial direction from a base end portion 29 toward a tip end portion 31, the base end portion located on the beginning point side in the bearing face 25A.

The imaging stage 7 obtains, from the semi-finished product 11A, end face image information of the both end faces 23A including the bearing faces 25A and end position image information indicating positions of the both end portions 33A, 35A in the un-curved axial direction and end turn image information indicating the number of turns (end turn number) of the end turn portion 17A of the end portion 33A or 35A located on a front side at the time of moving of the semi-finished product 11A in a formation step explained later.

Figure 3A:
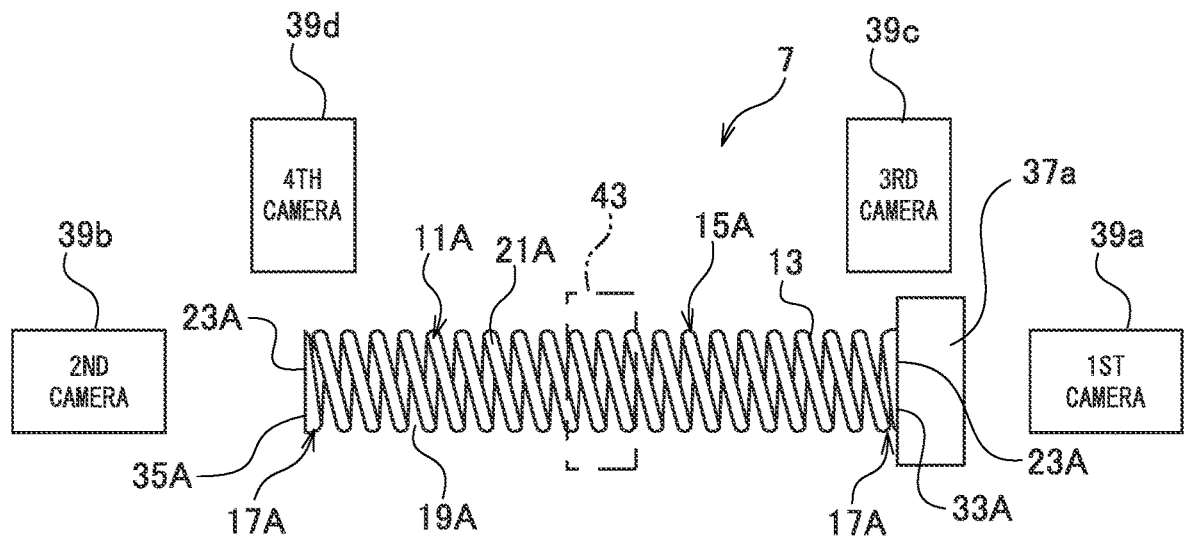
Figure 3B:
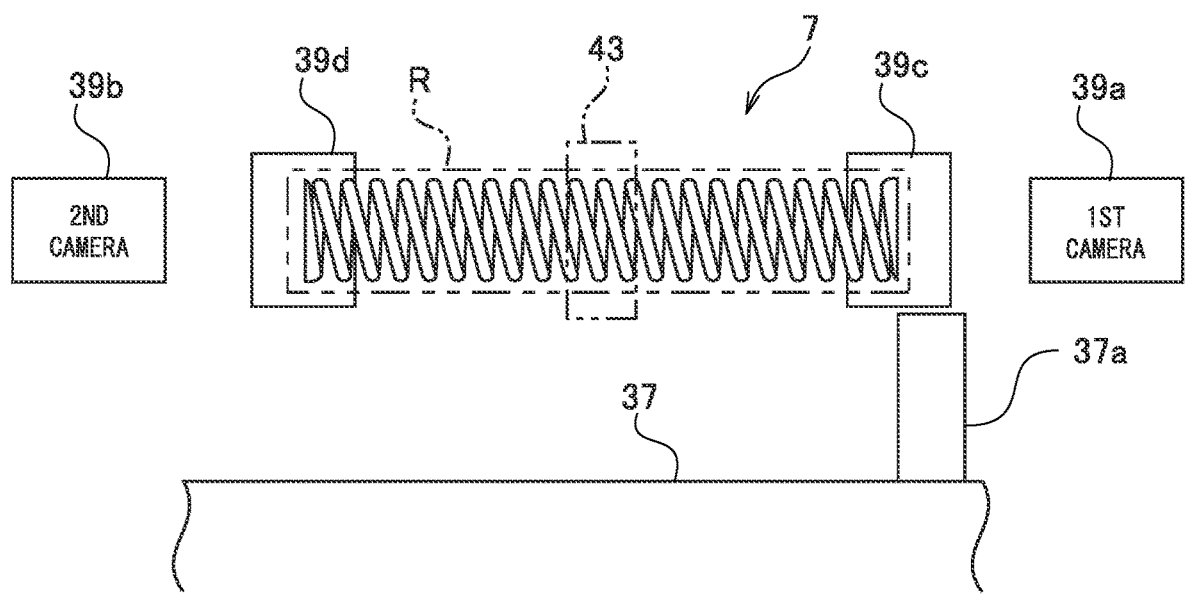

FIGS. 3A and 3B illustrate schematic configurations of the imaging stage 7 of the forming device 1 of FIG. 1 in which FIG. 3A is a plan view and FIG. 3B is a side view.

The imaging stage 7 of the present embodiment is provided with a positioning table 37, and 1st-4th cameras 39a, 39b, 39c, 39d as an imaging part.

To the positioning table 37, the semi-finished product 11A is fed from a feeding part 41. On the positioning table 37, a stopper 37a is provided on a front side in a feeding direction. The stopper 37a is a member projecting on the positioning table 37, and receives and positions the semi-finished product 11A fed from the feeing part 41. The positioned semi-finished product 11A is held by a holding and transferring mechanism 43 such as a pick and place unit to be placed in an imaging region R. It should be noted that the holding of the holding and transferring mechanism 43 is performed at the middle of the semi-finished product 11A in the un-curved axial direction.

The 1st-4rth cameras 39a, 39b, 39c, 39d are, for example, CCD cameras, CMOS cameras or the like, and are communicably connected to the control part 5 explained later via a wire or a wireless system. The 1st-4rth cameras 39a, 39b, 39c, 39d obtain the end face image information and the end position image information from the semi-finished product 11A which is in the imaging region R.

The 1st and the 2nd cameras 39a, 39b are arranged to be oriented toward the both end faces 23A of the semi-finished product 11A in the un-curved axial direction. With this, the 1st and the 2nd cameras 39a, 39b image the end face 23A of the semi-finished product 11A in the un-curved axial direction to obtain the end face image information.

The end face image information allows bearing face information to be grasped, the bearing face information including lengths of the bearing faces 25A in the circumferential direction, the positions of the end points of the bearing faces 25A, the beginning points (positions of the coil end portions 27) of the bearing faces 25A. Accordingly, imaging directions of the 1st and the 2nd cameras 39a, 39b are not necessarily the un-curved axial direction in the strict sense, and it may be inclined with respect to the un-curved axial direction as long as the end face image information which allows the bearing face information to be grasped is able to be obtained.

The 3rd and the 4th cameras 39c, 39d are arranged to be oriented toward the end portions 33A, 35A of the semi-finished product 11A in the radial direction of the semi-finished product 11A, respectively. According to the present embodiment, the 3rd camera 39c is oriented toward the first end portion 33A on the front side of the semi-finished product 11A in the feeding direction and the 4rth camera 39d is oriented toward the second end portion 35A on the rear side of the semi-finished product 11A in the feeding direction.

With this, the 3rd and the 4th cameras 39c, 39d image the both end portions 33A, 35A of the semi-finished product 11A in the radial direction to obtain the end position image information indicating positions of the both end portions 33A, 35A in the un-curved axial direction and the end turn image information indicating the end turn number of the end portion 33A or 35A.

It should be noted that the end position image information is information including not only the positions of the end portions 33A, 35A but also the end turn portions 17A and is used as the end turn image information according to the present embodiment. If the end position image information, however, indicates only the positions of the end portions 33A, 35A and does not include the end turn portions 17A, the end turn image information may be obtained separately.

Further, imaging directions of the 3rd and the 4th cameras 39c, 39d may be inclined with respect to the radial direction as long as the positions of the both end portions 33A, 35A and the end turn number are able to be obtained from the end position image information (end turn image information) similar to the imaging directions of the 1st and the 2nd cameras 39a, 39b. In addition, the 3rd camera 39c and the 4th camera 39d may be omitted.

The obtained end face image information and the end position image information are transmitted from the 1st to the 4th cameras 39a, 39b, 39c, 39d to the control part 5. The semi-finished product 11A from which the end face image information and the end position image information are obtained is transferred to the arc forming stage 9 with the holding and transferring mechanism 43.

Figure 4A:
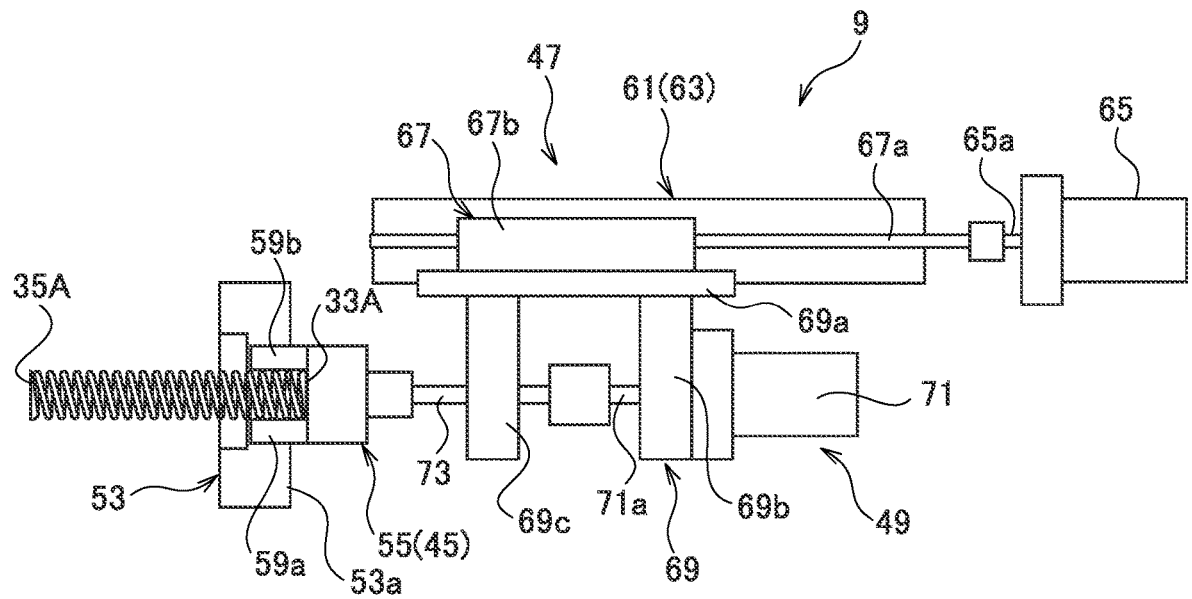
Figure 4B:
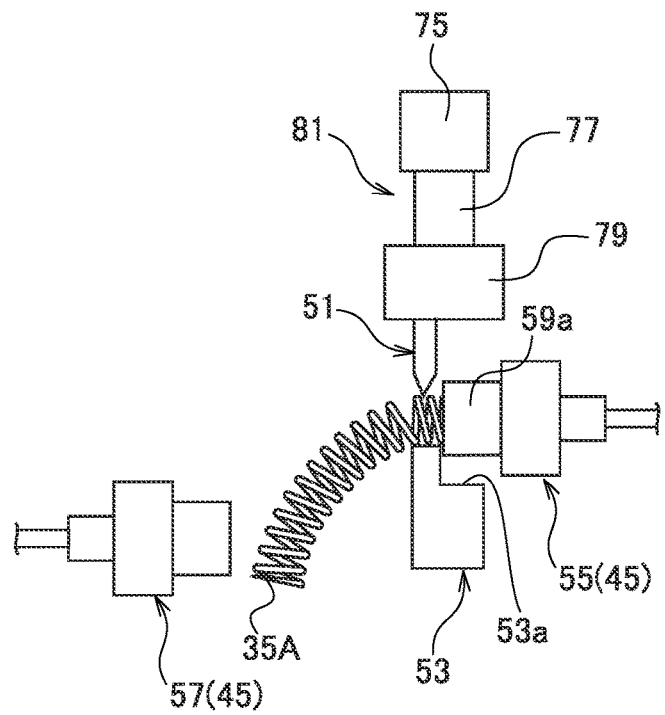

FIGS. 4A and 4B illustrate schematic configurations of the arc forming stage 9 of the forming device 1 of FIG. 1 in which FIG. 4A is a plan view and FIG. 4B is a partially omitted side view.

The arc forming stage 9 is provided with a holding part 45, an advancing mechanism part 47, a rotational mechanism part 49, a wedge part 51, and a die 53 serving as a supporting table.

The holding part 45 is to hold the semi-finished product 11A and move the semi-finished product in the un-curved axial direction. The holding part 45 of the present embodiment has a first holding part 55 and a second holding part 57 comprising holding mechanisms such as air chucks. The first and the second holding parts 55, 57 are configured symmetrically and each clip the semi-finished product 11A with a pair of holding pieces 59a, 59b in the radial direction intersecting a driving direction of the wedge part 51 explained later.

The first holding part 55 holds the first end portion 33A side of the semi-finished product 11A. The holding is performed when the semi-finished product 11A transferred with the holding and transferring mechanism 43 is succeeded to the arc forming stage 9. The second holding part 57 holds the second end portion 35A side of the semi-finished product 11A. The holding is performed by switching from the holding using the first holding part 55, in the middle of sequentially driving the wedge part 51 into the semi-finished product 11A as explained later. The second holding part 57 may be omitted.

The advancing mechanism part 47 is to move the holding part 45 in the un-curved axial direction of the semi-finished product 11A. The advancing mechanism part 47 of the present embodiment has a first and a second advancing mechanism parts 61, 63 for the first and the second holding parts 55, 57.

In addition, the first and the second advancing mechanism parts 61, 63 have symmetrical configurations and therefore only the first advancing mechanism part 61 will be explained. Further, the second advancing mechanism part 63 is omitted in the drawings and only the numerals thereof are indicated with parentheses.

The first advancing mechanism part 61 is provided with a servo motor 65 as a drive source, a ball screw mechanism 67 as an advancing drive part, and a movable part 69.

The servo motor 65 is fixed to a frame or the like which is not illustrated and is driven according to control of the control part 5 explained later. To an output shaft 65a of the servo motor 65, a ball screw 67a of the ball screw mechanism 67 is connected so as to be rotated integrally.

The ball screw 67a is extended in the un-curved axial direction of the semi-finished product 11A when the semi-finished product 11A is held by the first holding part 55. To the ball screw 67a, a nut part 67b of the ball screw mechanism 67 is screwed. To the nut part 67b, the movable part 69 is attached.

The movable part 69 is to intermittently move at predetermined pitches in the un-curved axial direction of the ball screw 67a as well as the nut part 67b according to rotation of the ball screw 67a. The movable part 69 is provided with a pair of supporting plates 69b, 69c projecting from a movable base 69a connected to the nut part 67b. The supporting plates 69b, 69c are arranged oppositely in the un-curved axial direction of the ball screw 67a. With the supporting plates 69b, 69c, the first holding part 55 is supported through the rotational mechanism part 49.

The rotational mechanism part 49 is provided with a servo motor 71 as a drive source, and a rotationally driving shaft 73.

The servo motor 71 is supported with the one supporting plate 69b and is intermittently driven at predetermined angles according to control of the control part 5 explained later. An output shaft 71a of the servo motor 71 passes through the one supporting plate 69b and the rotationally driving shaft 73 is connected to a front end of the output shaft so as to rotate integrally.

The rotationally driving shaft 73 passes through the other supporting plate 69c and is connected to the first holding part 55 so as to rotate integrally.

With this, the first holding part 55 causes the holding semi-finished product 11A to be rotated around the axis TA with the rotational mechanism part 49, and causes the holding semi-finished product 11A to intermittently move at the predetermined pitches in the un-curved axial direction using the advancing mechanism part 47.

Further, the second holding part 57 is capable of rotating and moving similarly to the first holding part 55.

The wedge part 51 has a front end formed into a wedge shape. The wedge part 51 is configured to be driven in synchronization with the moving of the semi-finished product 11A according to control of the control part 5 explained later, thereby to be driven into the inter-wires 19A of the semi-finished product 11A. The drive of the wedge part 51 is performed by a servo motor 75 as a drive source, a deceleration mechanism 77, and a driving mechanism part 81 having a driving drive part 79.

The servo motor 75 is fixed to a frame or the like which is not illustrated and is intermittently driven according to control of the control part 5 explained later. To the servo motor 75, the driving drive part 79 is connected through the deceleration mechanism 77.

The deceleration mechanism 77 decelerates drive torque of the servo motor 75 and outputs the same to the driving drive part 79 side. The driving drive part 79 converts rotational operation of the servo motor 79 into operation in the driving direction (vertical direction in the embodiment) with a cam or the like, thereby to reciprocatingly drive the wedge part 51 in the driving direction.

Accordingly, the wedge part 51 may increase in operation speed (driving speed) according to a reduction ratio of the deceleration mechanism 77 and a conversion rate of the driving mechanism part 81.

In particular, the reduction ratio of the deceleration mechanism 77 is reduced to increase the number of the drivings of the wedge part 51 per unit time. In this case, the operation speed of the wedge part 51 becomes faster so that the operation of the wedge part 51 may be unstable.

Then, the present embodiment reduces the conversion rate of the rotational operation to the operation in the driving direction of the driving mechanism part 81 according to, for example, reduction of a lifting amount of a cam or the like to reduce a driving stroke of the wedge part 51, thereby to make the operation speed of the wedge part 51 equivalent to the operation speed prior to the reduction of the reduction ratio. The present embodiment, therefore, reduce driving time while stabilizing the operation of the wedge part 51.

The die 53 is arranged to face the wedge part 51 in the driving direction and supports the semi-finished product 11A at the time of the driving of the wedge part 51. The die 53 has a stepped portion 53a to avoid interference with the first holding part 55.

Further, the die 53 of the present embodiment is arranged movably in the driving direction of the wedge part 51 to vary the driving amount of the wedge part 51. In addition, the die 53 may be fixed unmovably in the driving direction. Further, the movement of the die 53 may be performed in the same way as the advancing mechanism part 47.

The control part 5 is an information processing device to control each part of the device body 3. The forming device 1 of the present embodiment realizes the forming method for the arc spring (hereinafter simply referred to as the "forming method") according to the control and the processing with the control part 5. Functions of the control part 5 will be explained as well as the forming method.

The forming method of the present embodiment is started in response to that the semi-finished product 11A is fed from the feeding part 41 to the imaging stage 7 of the forming device 1, and performs an imaging step, a bearing face length determining step, a rotational position determining step, a specifying step, a length detecting step, an end turn number obtaining step, a rotation step, a preliminarily moving step, and a formation step.

In the imaging step, the control part 5 controls the holding and transferring mechanism 43 to hold the semi-finished product 11A and move the same to the imaging region R in response to that the semi-finished product 11A is fed on the positioning table 37 of the imaging stage 7. In addition, the feeding of the semi-finished product 11A may be detected by sensors or the like.

Moving the semi-finished product 11A to the imaging region R, the control part 5 controls the 1st to the 4th cameras 39a, 39b, 39c, 39d to cause the cameras to image the semi-finished product 11A and obtain the end face image information and the end position image information (end turn image information) of the semi-finished product 11A.

Next, in the bearing face length determining step, the control part 5 determines whether the length of each bearing face 25A of the semi-finished product 11A in the circumferential direction is within a permissible range based on the end face image information. The present embodiment determines whether the position of the coil end portion 27 and the position of the end point of the bearing face 25A are within permissible ranges in addition to the circumferential length of the bearing face 25A. It should be noted that the permissible ranges are set according to production requirements for the arc spring 11 (the same applies to the following).

The determination may be performed by image processing. At this time, although the beginning point (coil end portion 27) and the end point of the bearing face 25A need to be distinguished from each other, it is easily performed according to a difference in shape or the like. It should be noted that the position of the end point of the bearing face 25A is not the tip end portion 31 with the acute angle shape, but the base end portion 29. The position of the tip end portion 31 may be, however, the position of the end point of the bearing face 25A.

In addition, the semi-finished product 11A is discarded by controlling the holding and transferring mechanism 43 if any one of the circumferential lengths of the bearing faces 25A of the both end faces 23A of the semi-finished product 11A, the positions of the coil end portions 27, and the end points of the bearing faces 25A is without the permissible range.

Next, in the rotational position determining step, the control part 5 determines whether there is a rotational position of the semi-finished product 11A, the rotational position at which the bearing faces 25A on the both end faces 23A are respectively located within predetermined positions in the circumferential direction using the end face image information.

The predetermined positions mean specific positions at which the bearing faces 25A of the both end faces 23A should be positioned and permissible ranges with the specified positions as centers. According to the present embodiment, the predetermined positions are specific positions for the coil end portions 27 and the end points of the bearing faces 25A of the both end faces 23A and permissible ranges with those positions as centers. The predetermined positions may be, however, specific positions at which circumferential middle portions of the bearing faces 25A of the both end faces 23A should be positioned and permissible ranges or the like with those positions as centers.

The rotational position determining step of the present embodiment grasps correlations between the positions of the coil end portions 27 of the both end faces 23A and between the positions of the end points of the bearing faces 25A and determines whether there is a rotational position of the semi-finished product 11A in the circumferential direction, the rotational position at which all the four positions are in the specific positions and their permissible ranges in the circumferential direction.

In addition, the control part 5 controls the holding and transferring mechanism 43 to discard the semi-finished product 11A if there is no such rotational position.

Next, the specifying step specifies the rotational position of the semi-finished product 11A in the circumferential direction based on the result in the rotational position determining step (hereinafter, the rotational position specified is referred to as the "specified rotational position"), the rotational position at which the bearing faces 25A on the both end faces 23A are in the predetermined positions.

The specifying step of the present embodiment picks up the specified rotational position of the semi-finished product 11A in the circumferential direction, the specified rotational position at which all the positions of the coil end portions 27 of the both end faces 23A and the positions of the end points of the bearing faces 25A are within the permissible ranges of the specific positions in the circumferential direction.

When picking up the specified rotational position, it is preferred that the positions of the coil end portions 27 of the both end faces 23A and the positions of the end points of the bearing faces 25A are closest to the centers of the predetermined positions. Any one of rotational positions based on the determining result in the rotational position determining step may be, however, the specified rotational position as long as the positions of the coil end portions 27 of the both end faces 23A and the positions of the end points of the bearing faces 25A are within the predetermined positions. In that extent, the specified rotational position may be picked up so that any one of the positions of the coil end portions 27 of the both end faces 23A and the positions of the end points of the bearing faces 25A is positioned on the center of the predetermined position for example, and therefore the pickup of the specified rotational position may be performed according to optional criteria.

Next, in the length detecting step, the control part 5 detects a difference between a free length and a reference length of the semi-finished product 11A in the un-curved axial direction. The reference length is a length of a reference product of the semi-finished product 11A of the semi-finished product 11A every number of turns in the uncurved axial direction. According to the present embodiment, in the detection of the difference between the free length and the reference length, the control part 5 obtains a difference between the position of the second end portion 35A of the semi-finished product 11A and the position of the second end of the reference product based on the end position image information obtained in the imaging step.

Then, the control part 5 adjusts moving pitches of the semi-finished product 11A in the formation step explained later based on the obtained difference. An adjusting amount of the moving pitches is distributed to all or part of the inter-wires 19A of the semi-finished product 11A. For example, in a case of distributing to all the inter-wires 19A, it should be an amount that the obtained difference is divided by the number of turns of the semi-finished product 11A or the like. In this case, the number of turns being set when the semi-finished product 11A is produced may be used. The number of turns may be, however, actually measured from the semi-finished product 11A. The length detecting step of the present embodiment checks to see if the position of the first end portion 33A of the semi-finished product 11A is a reference position according to the end position image information of the first end portion 33A of the semi-finished product 11A. This is because the semi-finished product 11A may become apart from the stopper 37a due to own resiliency when coming into contact with the stopper 37a at the time of the feeding. If the position of the first end portion 33A of the semi-finished product 11A is deviated from the reference position according to that, it is used for adjustment when finding a position of the second end portion 35A of the semi-finished product 11A.

Next, in the end turn number obtaining step, the control part 5 obtains the end turn number of the end portion 33A or 35A located on the front side at the time of the moving of the semi-finished product 11A in the formation step explained later. The obtaining of the end turn number according to the present embodiment is performed from the end position image information obtained in the imaging step.

Figure 5:
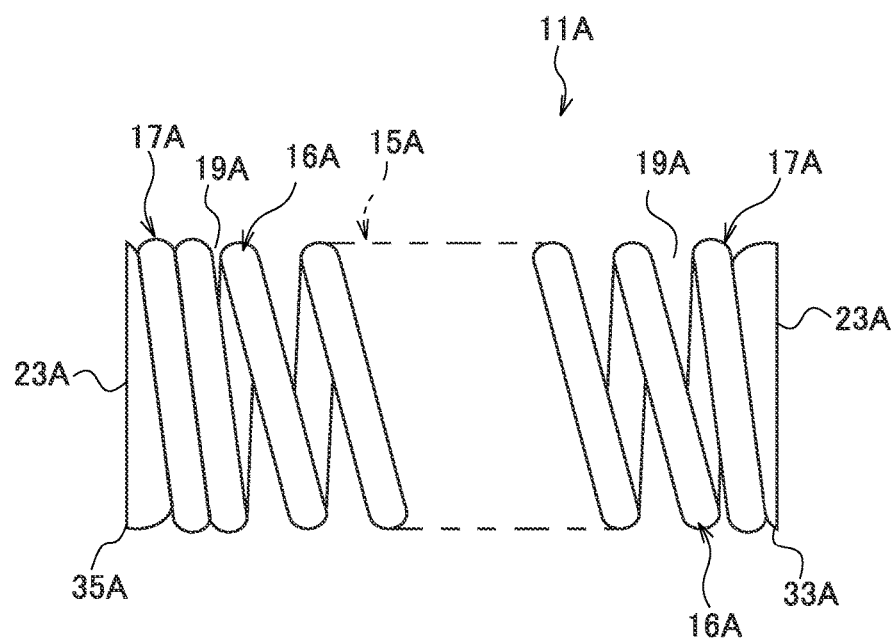
FIG. 5 is a side view illustrating an example of end turn portions of both end portions of the semi-finished product according to the embodiment of the present invention.

FIG. 5 is a side view illustrating an example of the end turn portions 17A of the both end portions 33A, 35A.

As illustrated in FIG. 5, the end turn portions 17A of the both end portion 33A, 35A are different in the end turn number in some cases. It should be noted that, in the example of FIG. 5, the end turn number on the first end portion 33A side is 2 and the end turn number on the second end portion 35A side is 3. With this, the first end portion 33A and the second end portion 35A are different in positions of the transition portions 16A in the un-curved axial direction.

The control part 5 adjusts a starting position for the driving of the wedge part 51 with respect to the semi-finished product 11A in the formation step explained later so as to be positioned at the inter-wire 19A based on the obtained end turn number. This adjustment is realized by corresponding the inter-wire 19A to be the starting position for the driving to the wedge part 51 in the preliminarily moving step.

A worker conventionally used to check end turn numbers of both end portions 33A, 35A of a semi-finished product 11A and to align the semi-finished product 11A and feed it to a forming device so as to put specific one of the end portions on a front side at the time of moving in a formation step. The present embodiment, however, dissipates needs for such alignment and a feed.

It should be noted that the semi-finished products 11A produced in the same lot have the same end turn numbers of the both end portions 33A, 35A. Thus, storing the adjustment information of the end turn numbers of the both end portions 33A, 35A and the starting position for the driving, the control part 5 specifies any one of the end portions to become on the front side at the time of moving in the formation step, thereby to indirectly obtain the end turn number and adjust the starting position for the driving. In this case, it may specify which one of the end portions 33A and 35A is on the aforementioned front side due to a difference in shapes of the end turn portions 27 based on the end face image information.

Further, the control part 5 may determine a difference in shapes such as inter-wire pitches and diameters in addition to the end turn numbers of the both end portions 33A, 35A and adjust the driving amount of the wedge part 51 in the formation step explained later according to the determining result.

At this time, conventionally determining a difference in shapes of both end portions 33A, 35A used to be dependent on visual observation of a worker, and therefore it was not possible to determine a fine difference which was not recognizable by the visual observation. The present embodiment, however, determines even such a fine difference.

Next, in the rotation step, the control part 5 controls the holding and transferring mechanism 43 to transfer the semi-finished product 11A to the arc forming stage 9 and cause the first holding part 55 to hold the semi-finished product 11A.

At this time, the present embodiment controls the rotational mechanism part 49 to rotate the first holding part 55 before holding the semi-finished product 11A according to the specified rotational position and returns the first holding part 55 back to an initial state prior to the rotating after holding the semi-finished product 11A to arrange the semi-finished product 11A on the specified rotational position. The rotation of the first holding part 55 is allowed to be performed in ranges of 180 degrees in different directions, to accelerate the rotating operation.

It should be noted that the semi-finished product may be rotated to the specified rotational position after the semi-finished product 11A is held by the first holding part 55. Further, the rotation of the semi-finished product 11A may be performed by a special mechanism or the like instead of the first holding part 55.

Next, in the preliminarily moving step, the control part 5 controls the advancing mechanism part 47 before the formation step to preliminarily move the semi-finished product 11A in the un-curved axial direction to adjust variation, which is caused by the rotational position, of the positions of the inter-wires 19.

Namely, the semi-finished product 11A has the coiled shape, so that the positions of the inter-wires 19A vary in the un-curved axial direction according to the rotational position. For this, the control part 5 finds a variation amount of the positions of the inter-wires 19A based on the rotational position and the inter-wire pitches of the semi-finished product 11A and the like and controls the advancing mechanism part 47 to move the semi-finished product 11A in a direction for eliminating the found variation amount.

At this time, the present embodiment, as mentioned above, adjusts the starting position for the driving of the wedge part 51 so as to be positioned at the inter-wire 19A between the transition portion 16A and the end turn portion 17A of the semi-finished product 11A in the end portion 33A or 35A (end portion 35A in the embodiment) on the front side at the time of the moving in the formation step. This is because the semi-finished product 11A is close-end and the wedge part 51 is not driven into the end turn portion 17A. In addition, in a case that a semi-finished product 11A is open-end, the wedge part 51 may be also driven into an end turn portion 17A and, at that time, there may be no need to adjust the starting position for the driving of the wedge 51 according to an end turn number.

Next, in the formation step, the control part 5 controls the driving mechanism part 81 to sequentially drive the wedge part 51 into the inter-wires 19A of the coiled shape of the semi-finished product 11A while controlling the advancing mechanism part 47 to move the semi-finished product 11A in the un-curved axial direction, thereby to deform the semi-finished product so as to curve the axis TA.

According to the present embodiment, the driving of the wedge part 51 is performed while the first holding part 55 holds the first end part 33 side of the semi-finished product 11A and the second end portion 35A side 35 of the semi-finished product 11A is moved so as to be pushed out relatively to the wedge part 51.

At the time of the beginning of the formation step, the semi-finished product 11A is positioned on the specified rotational position and therefore the driving of the wedge part 51 is performed in the state that the bearing faces 25A of the end faces 23A are accurately positioned on the predetermined positions.

Further, at the time of the beginning of the formation step, the first holding part 55 is always in the initial state in the state that the semi-finished product 11A is positioned on the specified rotational position, and the driving of the wedge part 51 is performed with stable operation. Further, the formation step is started from the initial state of the first holding part 55, whereby a positional relation between the first holding part 55 and the die 53 is approximately constant in a rotational direction of the first holding part 55 when the first holding part 55 approaches the die 53 according to advance of the moving of the semi-finished product 11A in the un-curved axial direction. Accordingly, the step 53a of the die 53 is certainly functioned to prevent the first holding part 55 and the die 53 from interfering each other.

Further, in the preliminarily moving step, the variation of the positions of the inter-wires 19A is adjusted according to the rotational position of the semi-finished product 11A, and the position of the semi-finished product 11A is adjusted so that the starting position for the driving of the wedge part 51 is at the inter-wire 19A. Accordingly, the wedge part 51 is certainly driven into the inter-wire 19A to avoid impact of the wedge part 51 against the semi-finished product 11A (coil 21A).

In the moving of the semi-finished product 11A, the control part 5 intermittently moves the semi-finished product 11A at the moving pitches adjusted in the length detecting step. With this, the present embodiment moves the semi-finished product 11A so as to absorb the difference between the free length and the reference length of the semi-finished product 11A, and more accurately drives the wedge part 51 into the inter-wire 19 to avoid the impact of the wedge part 51 against the semi-finished product 11A.

Even if the wedge part 51 impacts, however, against the semi-finished product 11A, the present embodiment monitors the drive torque of the servo motor 75 as the drive source for the driving mechanism part 81 by the control part 5 to detect the impact of the wedge part 51 against the semi-finished product 11A according to variation in peak values of the drive torque.

Figure 6:
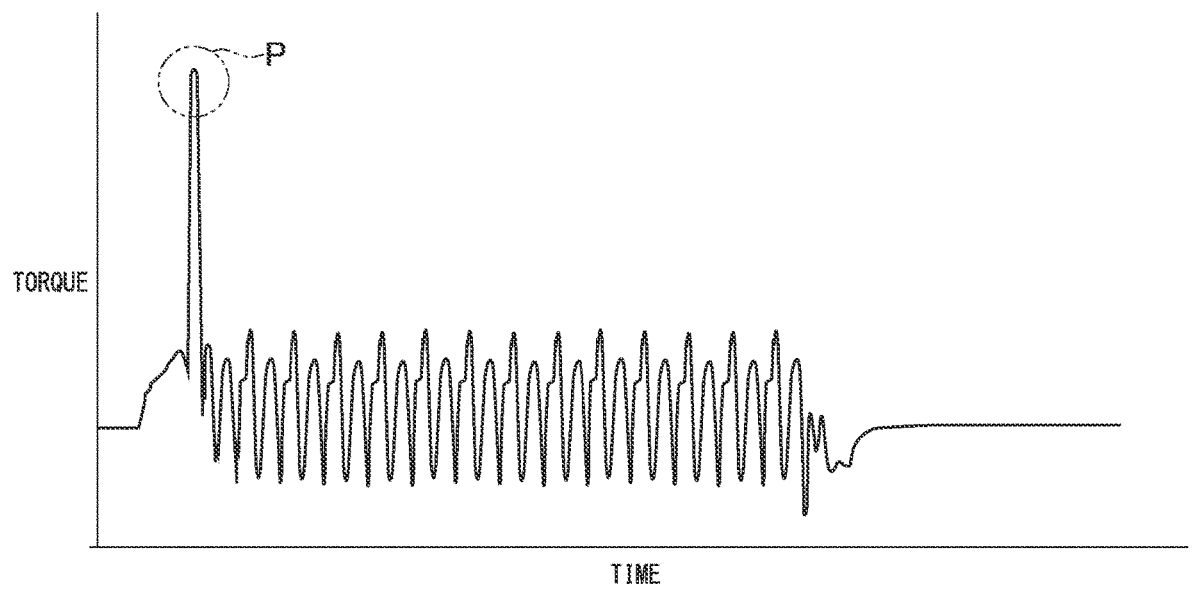
FIG. 6 is a graph illustrating drive torque (Embodiment).

FIG. 6 is a graph illustrating an example of a waveform of the drive torque. In FIG. 6, an ordinate indicates torque and an abscissa indicates time.

If the wedge part 51 impacts against the semi-finished product 11A, a prominent peak P is appeared in the waveform of the drive torque as illustrated in FIG. 6. Accordingly, a peak value of the peak P enables to detect the impact of the wedge part 51 against the semi-finished product 11A.

If the impact of the wedge part 51 against the semi-finished product 11A is detected, a dent or deformation may be generated on the arc spring 11. For this, with interruption of the formation step or after the formation step, the semi-finished product 11A or the arc spring 11 may be discarded. With this, the dent and the deformation on the arc spring 11 are prevented to stabilize the shape.

Further, in the present embodiment, the control part 5 controls the driving mechanism part 81 to vary the driving amount of the wedge part 51 according to the inter-wire pitches of the semi-finished product 11A, thereby to further stabilize the shape of the arc spring 11.

In particular, since the inter-wire pitches are relatively small in the transition portions 16A of the semi-finished product 11A, curvature becomes larger than of the main body 15A in which the inter-wire pitches are relatively large if the driving of the wedge part 51 is performed with the same driving amount as for the main body 15A. Then, the present embodiment makes the driving amount of the wedge part 51 in the transition portions 16A relatively small to close or match the curvatures of the transition portions 16A and the main body 15A to or with each other.

Reducing the driving amount of the wedge part 51 is realized by spacing the die 53 away from the wedge part 51 in the driving direction. To reduce the driving amount of the wedge part 51, however, the die 53 and the wedge part 51 should be spaced away from each other and the wedge part 51 may be spaced away from the die 53.

In this way, the wedge part 51 is sequentially driven into from the second end portion 35A to the first end portion 33A of the semi-finished product 11A. Then, the control part 5 switches the holding of the semi-finished product 11A from the first end portion 33A side by the first holding part 55 to the second end portion 35A side by the second holding part 57 before the driving of the wedge part 51 is reached the first end portion 33A of the semi-finished product 11A.

After the switching to the holding by the second holding part 57, the driving of the wedge part 51 is performed up to the first end portion of the semi-finished product 11A while the first end portion 33A side of the semi-finished product 11A is moved so as to be pulled toward the wedge part 51, to finish the formation step.

It should be noted that, although the forming method of the present embodiment performs the imaging step, the bearing face length determining step, the rotational position determining step, the specifying step, the length detecting step, the end turn number obtaining step, the rotation step, the preliminarily moving step, and the formation step in this order, it is not limited thereto. For example, the length detecting step should be performed before the formation step and may be performed after the rotation step or the preliminarily moving step or before the specifying step or the bearing-face-length determining step.

As mentioned above, the forming method of the present embodiment is provided with the bearing face length determining step of determining, for the semi-finished product 11A prior to curving the axis TA, whether the lengths of the bearing faces 25A on the both end faces 23A in the circumferential direction of the semi-finished product 11A are within the permissible ranges based on the end face image information of the both end faces 23A of the semi-finished product 11A imaged in the axial direction prior to the curving, the rotational position determining step of, if the lengths of the bearing faces 25A of the both end faces 23A in the circumferential direction are respectively within the permissible ranges, determining whether there is a rotational position of the semi-finished product 11A in the circumferential direction, the rotational position at which the bearing faces 25A on the both end faces 23A are respectively located within the predetermined positions in the circumferential direction using the end face image information, the specifying step of specifying the rotational position of the semi-finished product 11A for respectively arranging the bearing faces 25A on the both end faces 23A within the predetermined positions in the circumferential direction based on the determining result in the rotational position determining step, the rotation step of rotating the semi-finished product 11A to the specified rotational position, and the formation step of sequentially driving the wedge part 51 into inter-wires 19A of the coiled shape of the semi-finished product 11A while moving the semi-finished product 11A in the axial direction prior to the curving, thereby to deform the semi-finished product 11A.

The forming method of the present embodiment, therefore, sorts out the semi-finished product 11A in which the lengths of the bearing faces 25A of the both end face 23A in the circumferential direction are within the permissible ranges based on the end face image information of the both end faces 23A of the semi-finished product 11A. Then, the forming method of the present embodiment grasps the correlation between the both bearing faces 25A of the sorted-out semi-finished product 11A based on the end face image information of the both end faces 23A used for the sorting-out, and rotates the semi-finished product 11A to the specified rotational position to arrange the both bearing faces 25A on the predetermined positions.

Accordingly, the forming method of the present embodiment easily and accurately arranges the bearing faces 25A on the both end faces 23A of the semi-finished product 11A having the circumferential lengths within the permissible ranges onto the predetermined positions based on the end face image information of the both end faces 23A of the semi-finished product 11A.

As a result, the forming method of the present embodiment forms the arc spring 11 in which the bearing faces 25 on the both end faces 23 are arranged on the predetermined positions according to the production requirements. It, therefore, prevents forming errors of the arc spring 11 from being caused.

Further, the forming method of the present embodiment uses the end face image information as it is, which is used for the sorting-out of the semi-finished product 11A, for grasping the correlation between the bearing faces 25A of the both end faces 23A. The processing for the pick-up of the specified rotational position is quickly and easily performed.

The rotation step rotates the holding part 45, which is for holding the semi-finished product 11A, before holding the semi-finished product 11A according to the specified rotational position, and returns the holding part 45 back to the initial state prior to the rotating after holding the semi-finished product 11A to arrange the semi-finished product 11A on the specified rotational position, and the formation step performs the moving of the semi-finished product 11A in the un-curved axial direction.

Accordingly, in the forming method of the present embodiment, the first holding part 55 is always in the initial state in the rotational direction at the time of the beginning of the formation step, so that the driving of the wedge part 51 is performed with the stable operation and so that, even when the first holding part 55 approaches the die 53 according to the advance of the moving of the semi-finished product 11A in the un-curved axial direction, the first holding part and the die are prevented from interfering each other based on the design.

Further, the formation step sequentially performs the driving of the wedge part 51 from the second end portion 35A toward the first end portion 33A of the semi-finished product 11A while the second end 35A side of the semi-finished product 11A is moved so as to be pushed out relatively to the wedge part 51 by means of the holding of the first end portion 33A side of the semi-finished product 11A using the first holding part 55A. Then, it switches to the holding of the second end 35A side of the semi-finished product 11A using the second holding part 57A before the driving of the wedge part 51 is reached the first end portion 33A of the semi-finished product 11A, and the driving of the wedge part 51A is performed up to the first end portion 33A of the semi-finished product 11A while the first end portion 33A side of the semi-finished product 11A is moved so as to be pulled toward the wedge part 51.

The forming method of the present embodiment, therefore, accurately performs the driving of the wedge part 51 from the first end portion 33A to the second end portion 35A of the semi-finished product 11A including portions held by the first and the second holding parts 55, 57.

Further, the forming method of the present embodiment is provided with the preliminarily moving step of preliminarily moving the semi-finished product 11A in the un-curved axial direction before the formation step to adjust the variation in the positions of the inter-wires 19A of the semi-finished product 11A based on the rotational position. In the formation step, the wedge part 51 is, therefore, accurately driven into the inter-wires 19A to avoid the impact of the wedge part 51 against the semi-finished product 11A.

Moreover, the forming method of the present embodiment is provided with the length detecting step of detecting the difference between the free length and the reference length of the semi-finished product 11A, and the formation step moves the semi-finished product 11A in the un-curved axial direction to absorb the difference between the free length and the reference length.

The forming method of the present embodiment, therefore, more accurately drives the wedge part 51 into the inter-wires 19A to avoid the impact of the wedge part 51 against the semi-finished product 11A even if the semi-finished product 11A involves variation in the free length.

Further, the formation step varies the driving amount of the wedge part 51 according to the distance of the inter-wire 19A of the semi-finished product 11A in the un-curved axial direction. In particular, in the present embodiment, provided are the main body 15A, the end turn portion 17A of each end portion in the un-curved axial direction, and the transition portion 16A provided between the main body 15A and the end turn portion 17A and having the inter-wire pitches which are smaller than of the main body 15A. The formation step makes the driving amount of the wedge part 51 in the transition portion 16A smaller.

The forming method of the present embodiment, therefore, closes or matches the curvatures of the transition portion 16A and the main body 15A of the semi-finished product 11A to or with each other.

Further, the forming method of the present embodiment is provided with the end turn number obtaining step of obtaining the number of turns of the end turn portion 17A of the end portion 33A or 35A located on the front side at the time of the moving of the semi-finished product 11A in the formation step, and the starting position adjusting step of adjusting the starting position for the driving of the wedge part 51 relatively to the semi-finished product 11A in the formation step based on the obtained number of the turns of the end turn portion 17A.

The present embodiment, therefore, adjusts the starting position for the driving of the wedge part 51 to avoid the impact of the wedge part 51 against the semi-finished product 11A even if the end turn numbers of the both end portions 33A, 35A are different from each other.

Further, the present embodiment eliminates, according to the adjustment of the starting position for the driving, a need to align the semi-finished product 11A so that specific one end portion of the both end portions 33A, 35A of the semi-finished product 11A is on the front side at the time of the moving in the formation step and to feed the same to the forming device 1, thereby to improve rapidity of work.

Further, the present embodiment adjusts the driving amount of the wedge part 51 according to the differences between the both end portions 33A, 35A in shape such as diameter and inter-wire pitch, to stabilize the shape of the arc spring 11 and prevent forming errors from being caused. In this case, there is no need that determining the difference between the both end portions 33A, 35A in shape is dependent on visual observation of a worker, and therefore it determines a fine difference such as diameter and inter-wire pitch of the both end portions 33A, 35A which is not recognized by visual observation, to more accurately prevent forming errors from being caused.

The formation step performs the driving of the wedge part 51 according to the drive torque from the servo motor 75 of the driving mechanism part 81, and easily and accurately detects impact of the wedge part 51 against the semi-finished product 11A according to variation in peak values of the drive torque of the servo motor 75.

The forming device 1 of the present embodiment is provided with the 1st to 4th cameras 39a, 39b, 39c, 39d configured to image the both end faces 23A of the semi-finished product 11A in the un-curved axial direction to obtain the end face image information, the rotational mechanism part 49 configured to rotate the semi-finished product 11A, the holding part 45 configured to hold the semi-finished product 11A and move the semi-finished product 11A in the un-curved axial direction, the wedge part 51 configured to be driven into the inter-wires 19A of the coiled shape of the semi-finished product 11A to deform the semi-finished product 11A so as to curve the axis 19A at the time of the moving of the semi-finished product 11A, and the control part 5 controlling the holding part 45, the rotational mechanism part 49, and the wedge part 51, wherein the aforementioned method is carried out according to the control of the control part 5 to provide the same effects.

Since the rotational mechanism part 49 is capable of rotating the holding part 45, the rotational mechanism part is shared when rotating the semi-finished product 11A to the specified rotational position and when rotating the semi-finished product 11A to prevent the semi-finished product from twisting at the time of the driving, to simplify the forming device 1.

The forming device 1 of the present embodiment is provided with the die 53 supporting the semi-finished product 11A at the time of the driving of the wedge part 51 and being movable in the driving direction of the wedge part 51, wherein the control part 5 moves the die 53 in the driving direction of the wedge part 51 according to the distance of the inter-wire 19A of the semi-finished product 11A in the un-curved axial direction, to easily and accurately vary the driving amount of the wedge part 51.

The invention claimed is:

1. A forming method for an arc spring in which a wire is wound in a coiled shape with an axis curved and both end faces have respective bearing faces, comprising:
    a bearing face length determining step of determining, for a semi-finished product prior to curving the axis, whether lengths of the bearing faces on the both end faces in a circumferential direction are respectively within permissible ranges based on end face image information of the both end faces of the semi-finished product imaged in a direction along the axis of the semi-finished product prior to the curving;
    a rotational position determining step of, if the lengths of the bearing faces of the both end faces in the circumferential direction are respectively within the permissible ranges, determining whether there is a rotational position of the semi-finished product in the circumferential direction based on correlation of the both bearing faces of the both end faces acquired using the end face image information of the both end faces, the rotational position at which the bearing faces on the both end faces are respectively located within predetermined positions in the circumferential direction;
    a specifying step of specifying a rotational position of the semi-finished product at which the bearing faces on the both end faces are respectively located within the predetermined positions in the circumferential direction based on a determining result in the rotational position determining step;
    a rotation step of rotating the semi-finished product to the specified rotational position; and
    a formation step of sequentially driving a wedge part into inter-wires of the coiled shape of the semi-finished product while moving the semi-finished product in the direction along the axis prior to the curving, thereby to deform the semi-finished product.

2. The forming method for an arch spring according to claim 1, wherein
    the rotational step rotates a holding part, which is for holding the semi-finished product, according to the specified rotational position before holding the semi-finished product and returns the holding part back to an initial state prior to the rotating after holding the semi-finished product to arrange the semi-finished product on the specified rotational position, and
    the formation step holds the semi-finished product using the holding part to cause the semi-finished product to move in the direction along the axis of the semi-finished product prior to the curving.

3. The forming method for an arch spring according to claim 2, wherein
    the holding part is provided with a first holding part to hold a first end portion side of the semi-finished product and a second holding part to hold a second end portion side of the semi-finished product,
    the rotational step rotates the first holding part according to the specified rotational position before holding the semi-finished product and returns the first holding part back to an initial position prior to the rotating after holding the semi-finished product to arrange the semi-finished product on the rotational position, and
    the formation step sequentially performs the driving of the wedge part from said second end portion toward said first end portion of the semi-finished product while said second end portion side of the semi-finished product is moved so as to be pushed out relatively to the wedge part by means of the holding of said first end portion side of the semi-finished product using the first holding part, and switches to the holding of said second end portion side of the semi-finished product using the second holding part before the driving of the wedge part is reached said first end portion of the semi-finished product and performs the driving of the wedge part up to said first end portion of the semi-finished product while said first end portion side of the semi-finished product is moved so as to be pulled toward the wedge part.

4. The forming method for an arch spring according to claim 1 further comprising:
    a preliminarily moving step of preliminarily moving the semi-finished product in the direction along the axis prior to the curving before the formation step to adjust variation in positions of the inter-wires based on the rotational position.

5. The forming method for an arch spring according to claim 1 further comprising:
    a length detecting step of detecting a difference between a free length of the semi-finished product and a reference length, wherein
    the formation step moves the semi-finished product in the direction along the axis to absorb the difference between the free length and the reference length.

6. The forming method for an arch spring according to claim 1, wherein
    the formation step varies a driving amount of the wedge part according to a distance of the inter-wire of the semi-finished product in the direction along the axis prior to the curving.

7. The forming method for an arch spring according to claim 6, wherein
    the semi-finished product has a main body, an end turn portion of each end portion in the direction along the axis prior to the curving, and a transition portion provided between the main body and the end turn portion and having a distance of the inter-wire in the direction along the axis prior to the curving which is smaller than of the main body, and
    the formation step reduces the driving amount of the wedge part at the transition portion.

8. The forming method for an arch spring according to claim 1, wherein
    the semi-finished product has an end turn portion of each end portion in the direction along the axis prior to the curving, and
    the method further comprises:
        an end turn number obtaining step of obtaining the number of turns of the end turn portion of the end portion of the semi-finished product located on a front side at the time of the moving of the semi-finished product in the formation step; and a starting position adjusting step of adjusting a starting position for the driving of the wedge part relatively to the semi-finished product in the formation step based on the obtained number of the turns of the end turn portion.

9. The forming method for an arch spring according to claim 1, wherein the formation step performs the driving of the wedge part based on drive torque from a drive source, and detects impact of the wedge part to the semi-finished product according to variation in peak values of the drive torque.

\* \* \* \* \*